United States Patent
Rodriguez et al.

(10) Patent No.: US 7,289,899 B2
(45) Date of Patent: Oct. 30, 2007

(54) METHOD AND SYSTEM FOR CALCULATING BRAKE TORQUE PRODUCED BY A TURBOCHARGED ENGINE

(75) Inventors: Rogelio Rodriguez, Plainfield, IL (US); Adam C. Lack, Willow Springs, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 122 days.

(21) Appl. No.: 11/363,802

(22) Filed: Feb. 28, 2006

(65) Prior Publication Data

US 2007/0199322 A1   Aug. 30, 2007

(51) Int. Cl.
*B60K 41/04* (2006.01)
(52) U.S. Cl. .................. 701/102; 701/51; 701/54; 60/605.2
(58) Field of Classification Search .......... 701/103, 701/102, 101, 110, 115, 51, 54; 60/602, 60/605.2; 477/115, 110, 120
See application file for complete search history.

(56) References Cited

U.S. PATENT DOCUMENTS

| | | | |
|---|---|---|---|
| 6,016,459 A * | 1/2000 | Isaac et al. | 701/102 |
| 6,584,391 B2 | 6/2003 | Lack | |
| 6,651,432 B1 * | 11/2003 | Gray, Jr. | 60/605.2 |
| 7,047,741 B2 * | 5/2006 | Gray, Jr. | 60/603 |

\* cited by examiner

*Primary Examiner*—Hieu T. Vo
(74) *Attorney, Agent, or Firm*—Jeffrey P. Calfa; Gerald W. Askew

(57) ABSTRACT

Torque being produced by a turbocharged internal combustion engine (12) during acceleration under load is calculated by processing (34) a value for actual boost MAP and a value MAP_NOMINAL selected from a map (32) that contains data values for boost that would prevail during steady state engine operation at a respective speed with the engine developing a respective torque. The selection is made using engine speed N and estimated torque TQI_SP that possesses some inaccuracy due to some disparity between the data value for actual boost and the data value selected from the map. The selection yields a boost disparity value that is used along with the estimated torque to select from a torque map (36) a value for calculated torque that provides a better correlation with actual torque than does the estimated torque during acceleration.

15 Claims, 1 Drawing Sheet

METHOD AND SYSTEM FOR CALCULATING BRAKE TORQUE PRODUCED BY A TURBOCHARGED ENGINE

FIELD OF THE INVENTION

This invention relates to turbocharged engines and particularly to a method and system for calculating brake torque produced by a turbocharged diesel engine.

BACKGROUND OF THE INVENTION

Electronic control systems associated with motor vehicle powertrains utilize certain data for performing control functions. Some data that is processed by control algorithms to develop control data is obtained directly from sensors while other data used by control algorithms is developed by processing certain data according to various other algorithms. Because driving conditions frequently change during typical trips made by a motor vehicle, data that is used by control algorithms must be updated with sufficient regularity to accurately reflect changes, and processing performed by an electronic control system must be fast enough to keep pace with changing conditions in order to assure optimal vehicle performance. Transients in engine/powertrain operation are especially challenging for control systems.

Because of particular dynamics of particular engine/powertrain components and/or the manner in which data for, or related to, them is developed, certain data that is important for optimal vehicle performance may not track operational changes, especially transients, with sufficient timeliness for optimal vehicle performance as those changes are occurring.

For example, shifting of an automatic transmission may be controlled by the amount of engine brake torque being produced by an internal combustion engine. When control of transmission shifting is electronic in nature, a processing system must develop accurate engine brake torque data for use by an automatic transmission controller to assure shifting at the proper time. Because shifting occurs as a consequence of the vehicle being accelerated or decelerated, the powertrain is in a dynamic state, and so is data related to it.

A known processing strategy for calculating engine brake torque data during transient operation, such as during engine acceleration, uses engine rotational inertia data and engine speed change (acceleration) data to compensate basic torque data that is being calculated according to what is essentially a steady-state algorithm. While the iteration rate of the steady-state algorithm, in conjunction with compensation for acceleration transients, might seem sufficiently fast to yield accurate brake torque data as the engine speed changes, various factors, such as component dynamics, affect accuracy and lead to the need for even better transient compensation.

One of the present inventor's prior patents, U.S. Pat. No. 6,584,391, relates to a system and method for engine torque calculation. The algorithm that is embodied in that system and method calculates gross engine torque by processing engine speed and fueling data. Net torque, i.e. brake torque, is calculated by calculating torque losses and subtracting those losses from calculated gross torque.

One component of torque loss is engine pumping loss, which is a function of different factors that include intake manifold pressure and exhaust backpressure. When the engine accelerates, an engine speed derivative term calculation contributes to transient compensation for engine torque.

In certain motor vehicles having turbocharged engines and automatic transmissions whose shift points are electronically controlled, it has been observed that shift quality may be affected by the nature of certain turbochargers, such as certain two-stage turbochargers. Through recognition that the quality of transmission shifts is attributable to the effect of such turbochargers on the prior method for brake torque calculation, the inventors have created a novel and improved strategy for calculating engine brake torque.

SUMMARY OF THE INVENTION

Accordingly, the present invention provides a novel strategy that can more accurately calculate changing engine brake torque in a turbocharged engine as the change is occurring. This is especially advantageous for controlling a motor vehicle powertrain that has an automatic transmission whose shift points are electronically controlled by calculated engine brake torque.

Briefly, the present invention relates to a method for calculating engine brake torque as an engine accelerates under load using an intake manifold pressure model and actual engine boost. The model correlates steady-state boost with various combinations of engine speed and engine load based on steady-state engine operation. As the engine accelerates, engine speed and an estimate of engine torque are repeatedly processed to cause a data value for boost to be selected from a map that has been populated for the various combinations of speed and load. Intake manifold pressure representing actual boost is obtained in any suitably appropriate way.

The estimated torque results from processing certain data according to an algorithm that possesses some inaccuracy due to some disparity between the data value for actual boost during acceleration and the data value selected from the map.

The processing continues by calculating discrepancy between actual boost and boost indicated by the model using current engine speed and current estimated torque.

The discrepancy is then used in conjunction with the estimated torque to provide calculated torque that has been proven to more closely track actual torque during engine acceleration under load than does the estimated torque. In particular, data values for current estimated torque and current boost discrepancy are processed to select a data value for calculated torque from a second map that has been populated with torque data values correlated with various combinations of boost discrepancy and torque as a result of further engine development testing.

It is the data value for calculated torque from the second map that tracks actual torque during engine acceleration under load more closely than the estimated torque.

While general principles of the invention are not limited to any particular type of turbocharger, the invention is considered especially useful when the engine has a two-stage turbocharger. The invention can benefit a turbocharged engine by taking into account turbo lag, altitude, and ambient temperature. It can accommodate calibration changes and compensate for various factors such as engine wear, manifold leaks, tolerances, and even certain types of failures.

Accordingly, one generic aspect of the present invention relates to a method for calculating torque being produced by a turbocharged internal combustion engine during acceleration under load by processing a data value for actual boost and a data value for boost selected from a boost map that contains data values for boost, each of which represents boost that would prevail during steady state engine operation at a respective speed with the engine developing a respective torque and each of which is correlated with a respective set of data values for engine speed and torque.

The selection is made using a data value for engine speed and a data value for estimated torque that possesses some inaccuracy due to some disparity between the data value for actual boost and the data value selected from the map. The selection yields a boost disparity data value representing disparity between the data value for actual boost and the data value for boost selected from the map.

The boost disparity data value and the data value for estimated torque are processed to select from a torque map that contains data values for indicated torque, each of which is correlated with a respective set of data values for boost disparity and torque, a data value for calculated torque correlated with the boost disparity data value and the data value for estimated torque.

It is the calculated torque from the torque map that provides a better correlation with actual torque than does the estimated torque during acceleration.

Another generic aspect relates to an engine system including a processor that embodies the foregoing method.

Still another generic aspect relates to a processing system for use in association with a turbocharged internal combustion engine. The processing system comprises a processor for executing data processing algorithms, one of which selects data values from first and second maps.

The first map contains data values for boost each of which is developed during steady state engine operation at a respective speed while the engine is developing a respective torque and each of which is arranged in the map in correlation with a respective set of data values for engine speed and torque.

The second map contains data values providing for correction of a data value for estimated torque that possesses some inaccuracy due to some disparity between a data value for actual boost and a data value for boost selected from the first map. Each data value in the second map is arranged in correlation with a respective set of data values for discrepancy between the data value for actual boost and the data value from the first map.

When the processor executes the one algorithm, a data value from the first map correlated with data values for engine speed and estimated torque is selected, The data value for actual boost and the data value selected from the first map are processed to obtain a data value representing discrepancy between the two, and it is processed along with a data value for estimated torque to select the corresponding data value from the second map.

In a preferred embodiment, the data values in the second map are calculated torque values. They could however be correction factors that are processed with a torque value needing correction, such as estimated torque, to develop more accurate calculated torque.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
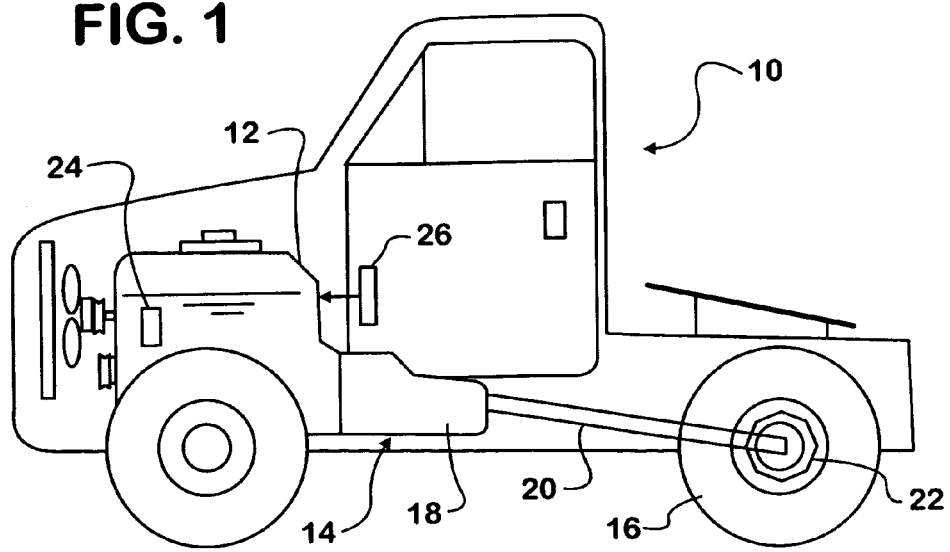
FIG. 1 is a diagram of a motor vehicle that comprises an engine system embodying principles of the invention.

FIG. 1 shows a truck 10 representing a motor vehicle that embodies principles of the invention. Truck 10 comprises an internal combustion engine 12, a diesel engine for example, and a powertrain 14 through which engine 12 delivers torque to driven wheels 16 that propel the truck. Powertrain 14 includes a transmission 18, a driveshaft, 20, and an axle 22 to which wheels 16 are fastened.

Engine 12 includes a turbocharger 24 that is operated by engine exhaust gases to create boost in one or more intake manifolds of engine 12, the number of manifolds depending on the particular engine. While the invention has been found especially useful in certain engines having certain two-stage turbochargers, the invention is considered potentially beneficial in turbocharged engines generally.

Engine 12 is part of an engine system that further includes a processor-based control system 26 that processes data from various sources to develop various control data for controlling various aspects of engine and powertrain operation. The data processed by may originate at external sources, such as various sensors and/or be generated internally. Examples of data processed and/or developed by processing may include, for example, engine speed, intake manifold pressure (i.e., boost), exhaust manifold pressure, fuel injection pressure, fueling quantity and timing, mass airflow, and accelerator pedal position. The results of such processing yield data values for control parameters.

Engine brake torque is one of those control parameters. One use of engine brake torque data is for control of automatic transmission shifting. As mentioned earlier, it has been observed that transmission shift quality may be affected by the nature of certain turbochargers in certain engines, such as certain two-stage turbochargers, and it is from that observation that the inventors have created a novel and improved strategy for calculating engine brake torque.

Figure 2:
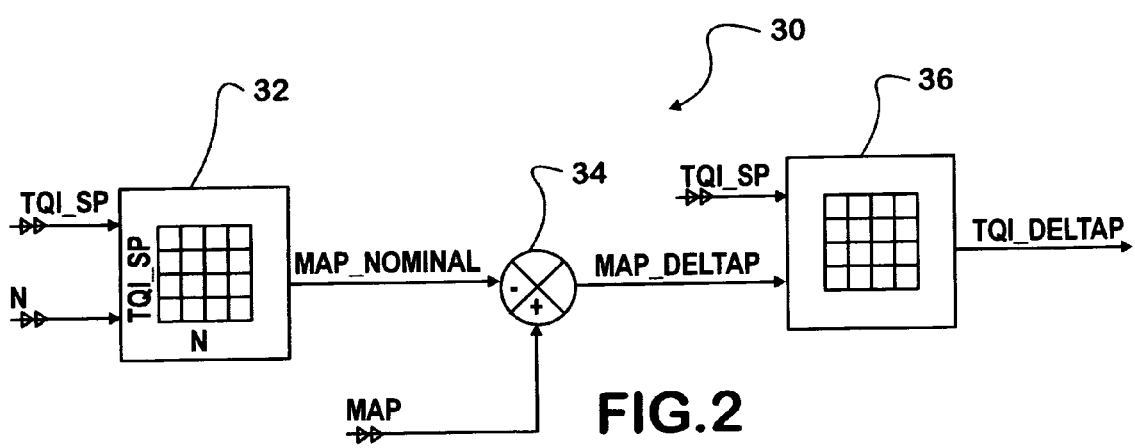
FIG. 2 is a schematic strategy diagram illustrative of principles of the invention that are embodied in the engine system and that are useful for control of certain devices in a powertrain of the motor vehicle.

That strategy appears in the diagram 30 of FIG. 2 which shows a boost map 32, an algebraic summing function 34, and a calculated torque map 36. A parameter N represents engine speed and a parameter TQI_SP represents estimated torque. A parameter MAP_NORMAL represents a data value selected from boost map 32, and a parameter MAP represents actual intake manifold pressure, boost in the case of a turbocharged engine like engine 12. A parameter TQI_DELTAP represents a data value for calculated torque selected from torque map 36.

A data value for estimated torque TQI_SP results from execution of a torque estimation algorithm by control system 26. It has been discovered that during certain engine transients, such as accelerations under load, even a sufficiently high iteration rate for calculating estimated torque does not provide the best accuracy in tracking true torque being delivered. The inventors have recognized that characteristics of certain turbochargers have a significant influence on the ability of the estimated torque to accurately track true torque, and consequently have improved the accuracy of torque calculation during transients by incorporating the strategy of diagram 30 into the torque calculation strategy in control system 26.

As the strategy iterates during engine acceleration under load, data values for engine speed N and estimated torque TQI_SP are used to select from boost map 32 a current data value for parameter MAP_NOMINAL, and the selected value is then processed by function 34 with the current data value for engine speed N to yield a data value for a parameter MAP_DELTAP representing the difference between the two.

Map 32 is populated with data values for boost, each of which represents boost that would prevail during steady state engine operation at a respective speed with the engine developing a respective torque. Each data value for boost in the map is correlated with a respective set of data values for engine speed and torque. During engine acceleration under load, the data value for estimated torque has been found to possess some inaccuracy due to some disparity between the data value for actual boost and the data value selected from the map. Hence, the purpose of function 34 is to measure the extent of the disparity in boost. The strategy then uses the calculated boost disparity and the data value for estimated torque to select from torque map 36 a data value for calculated torque that more accurately reflects torque being developed by the engine during acceleration than does the estimated torque.

Map 36 is populated with calculated torque data values, each of which is correlated with a respective set of data values for boost disparity and torque. The data value selected from map 36 (parameter TQI_DELTAP) is called "calculated" torque as distinguished from "estimated" torque (parameter TQI_SP). It is TQI_DELTAP that is preferably used for control purposes such as controlling shifting of transmission 18 when the transmission is one whose shifting is controlled using brake engine torque data. In this instance it would be understood that TQI_DELTAP represents engine brake torque.

While a presently preferred embodiment of the invention has been illustrated and described, it should be appreciated that principles of the invention apply to all embodiments falling within the scope of the following claims.

What is claimed is:

1. An internal combustion engine system comprising:
a turbocharger for turbocharging the engine;
a processor for executing data processing algorithms;
a data source providing a data value for actual boost;
a boost map containing data values for boost each of which is developed during steady state engine operation at a respective speed with the engine developing a respective torque and each of which is arranged in the map in correlation with a respective set of data values for engine speed and torque; and
a torque map containing data values for calculated torque, each correlated with a respective set of data values for boost disparity and torque;
wherein the processor comprises a torque calculation algorithm that when executed as the engine accelerates under load, is arranged to a) calculate a data value for boost disparity by processing the data value for actual boost and a data value for boost selected from the boost map using a data value for actual engine speed and a data value for estimated torque that possesses some inaccuracy due to some disparity between the data value for actual boost and the data value for boost selected from the boost map, and b) select from the torque map a data value for calculated torque correlated with the data value for boost disparity and the data value for estimated torque.

2. An engine as set forth in claim 1 wherein the torque calculation algorithm, when executed as the engine accelerates under load, is arranged to calculate the data value for boost disparity as the difference between the data value for actual boost and the data value for boost selected from the boost map.

3. An engine as set forth in claim 1 wherein a portion of the torque calculation algorithm comprises an estimated torque calculation algorithm that, when executed as the engine accelerates under load, calculates a data value for estimated torque that includes compensating the data value for estimated torque for engine acceleration.

4. An engine as set forth in claim 3 wherein the estimated torque calculation algorithm is arranged to include the data value for actual boost in the processing.

5. An engine as set forth in claim 1 including a motor vehicle powertrain that is powered by the engine and comprises a device that is controlled by the data value for calculated torque from the torque map.

6. An engine as set forth in claim 5 wherein the device comprises a transmission through which the engine transmits torque to driven wheels and whose shifting is controlled by the data value for calculated torque from the torque map.

7. A processing system for use in association with a turbocharged internal combustion engine, the processing system comprising:
a processor for executing data processing algorithms, one of which selects data values from first and second maps;
the first map containing data values for boost each of which is developed during steady state engine operation at a respective speed while the engine is developing a respective torque and each of which is arranged in the map in correlation with a respective set of data values for engine speed and torque; and
a second map containing data values providing for correction of a data value for estimated torque that possesses some inaccuracy due to some disparity between a data value for actual boost and a data value for boost selected from the first map, each data value in the second map being arranged in correlation with a respective set of data values for discrepancy between the data value for actual boost and the data value from the first map;
wherein when the processor executes the one algorithm, a data value from the first map correlated with data values for engine speed and estimated torque is selected, a data value for discrepancy between the data value for actual boost and the data value from the first map is calculated, and a data value from the second map correlated with the data values for estimated torque and the discrepancy between the data value for actual boost and the data value from the first map is selected.

8. A processing system as set forth in claim 7 wherein the data values in the second map comprise data values for calculated torque.

9. A processing system as set forth in claim 7 wherein the data values in the second map comprise data values for calculated brake torque.

10. A method for calculating torque being produced by a turbocharged internal combustion engine during acceleration under load, the method comprising:
during acceleration under load,
1) processing a data value for actual boost and a data value for boost selected from a boost map that contains data values for boost, each of which represents boost that would prevail during steady state engine operation at a respective speed with the engine developing a respective torque and each of which is correlated with a respective set of data values for engine speed and torque, the selection being made using a data value for engine speed and a data value for estimated torque that possesses some inaccuracy due to some disparity between the data value for actual boost and the data value selected from the map, to yield a boost disparity data value representing disparity between the data value for actual boost and the data value for boost selected from the map, and 2) processing the boost disparity data value and the data value for estimated torque to select from a torque map that contains data values for calculated torque, each of which is correlated with a respective set of data values for boost disparity and torque, a data value for calculated torque correlated with the boost disparity data value and the data value for estimated torque.

11. A method as set forth in claim 10 wherein the step of processing a data value for actual boost and a data value for boost selected from the boost map comprises subtracting one from the other and using the difference as the boost disparity data value.

12. A method as set forth in claim 10 wherein the data value for estimated torque is calculated by processing that includes processing for compensating the data value for estimated torque for engine acceleration.

13. A method as set forth in claim 12 wherein calculation of the data value for estimated torque uses the data value for actual boost in the processing.

14. A method as set forth in claim 10 including the further step of using the data value for calculated torque from the torque map in processing that controls a function associated with operation of a device in a motor vehicle powertrain that is powered by the engine.

15. A method as set forth in claim 14 wherein the further step comprises using the data value for calculated torque from the torque map in processing that controls shifting of a transmission through which the engine transmits torque to driven wheels.

* * * * *